C. H. MARSHALL.
CHERRY PITTING MACHINE.
APPLICATION FILED OCT. 13, 1915.
1,167,005.
Patented Jan. 4, 1916.
5 SHEETS—SHEET 1.
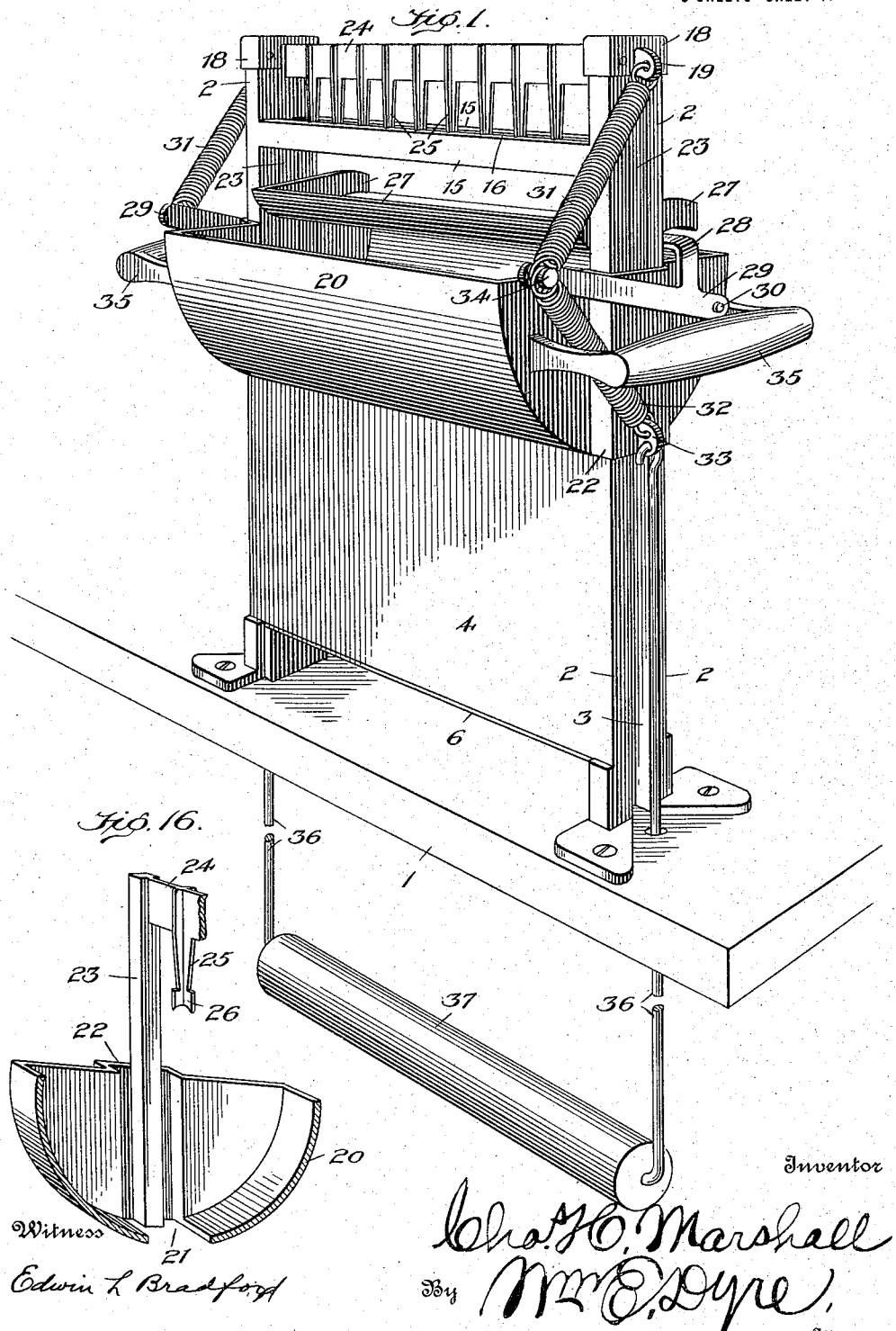

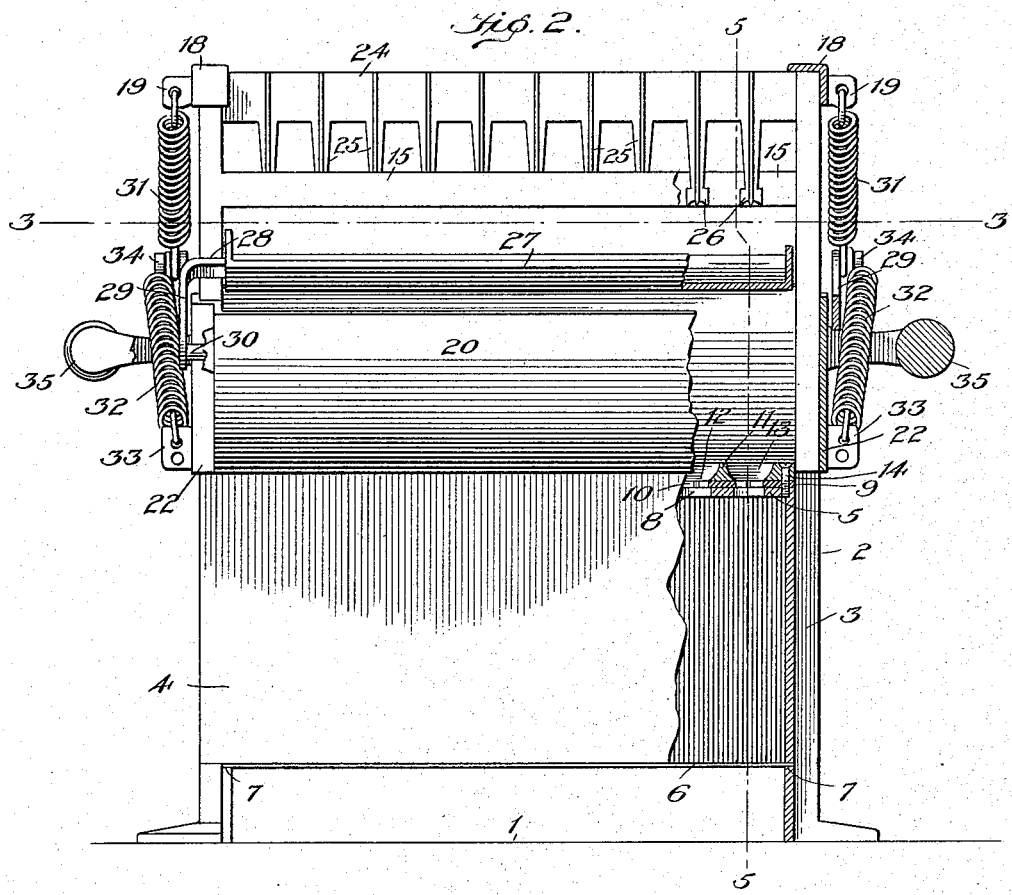
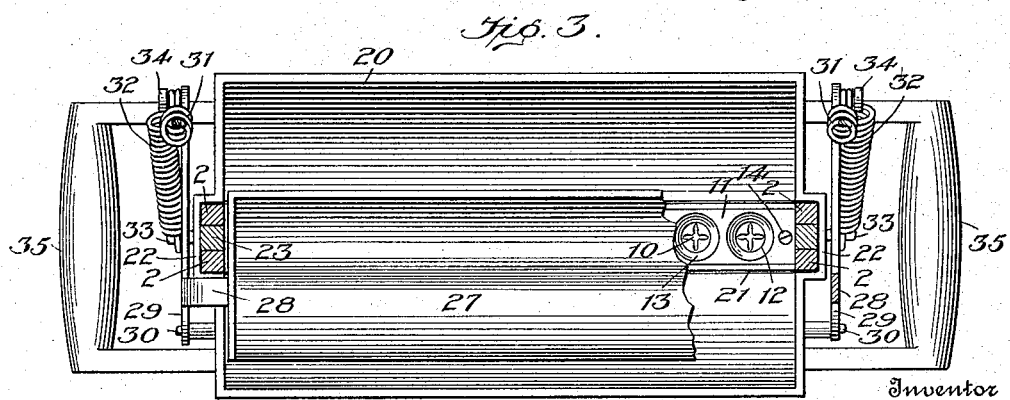

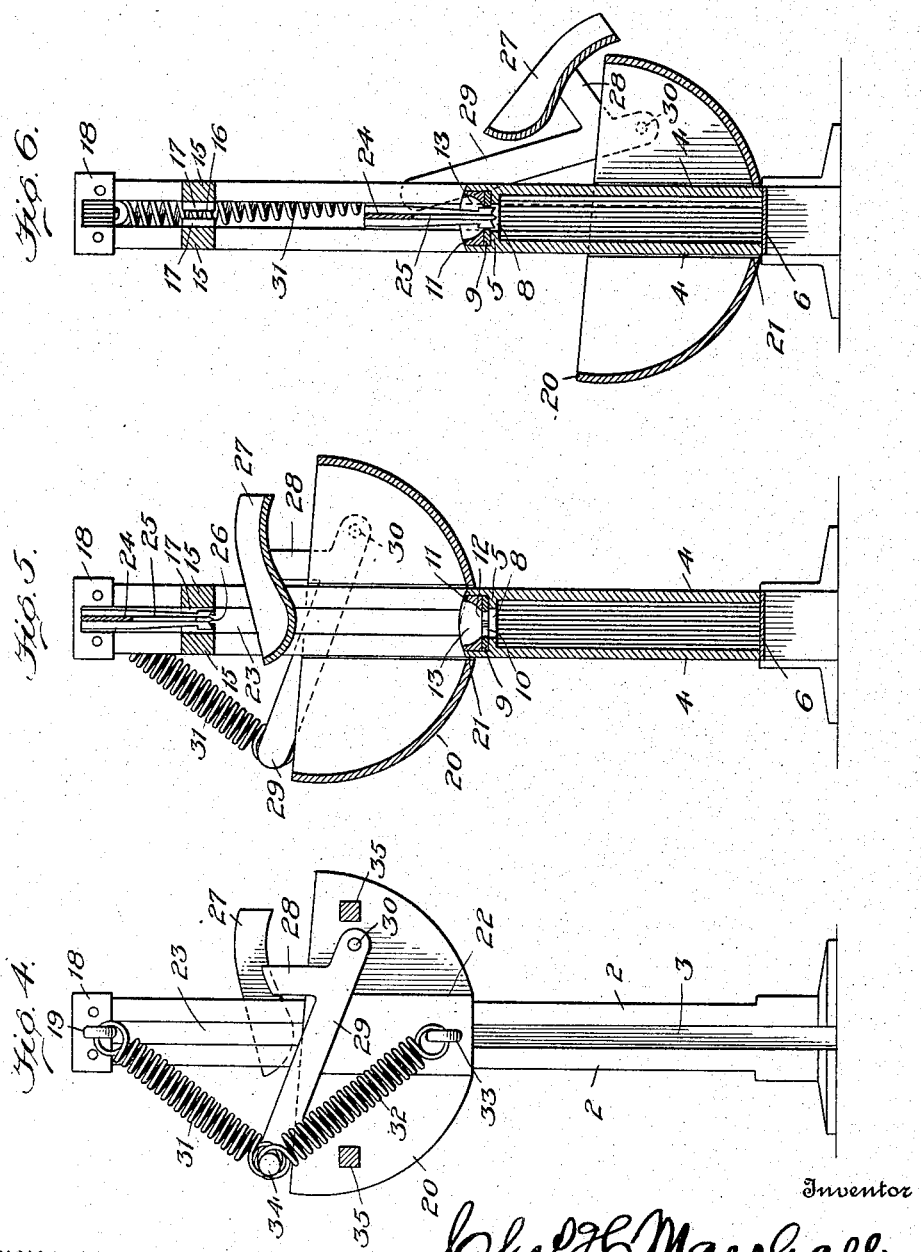

C. H. MARSHALL.
CHERRY PITTING MACHINE.
APPLICATION FILED OCT. 13, 1915.
1,167,005.
Patented Jan. 4, 1916.
5 SHEETS—SHEET 4.
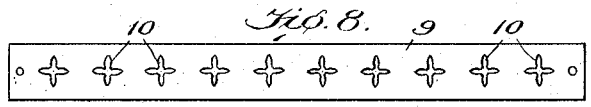
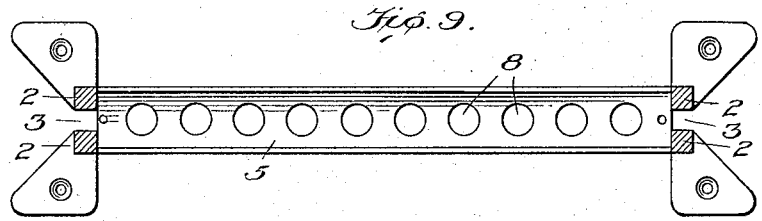
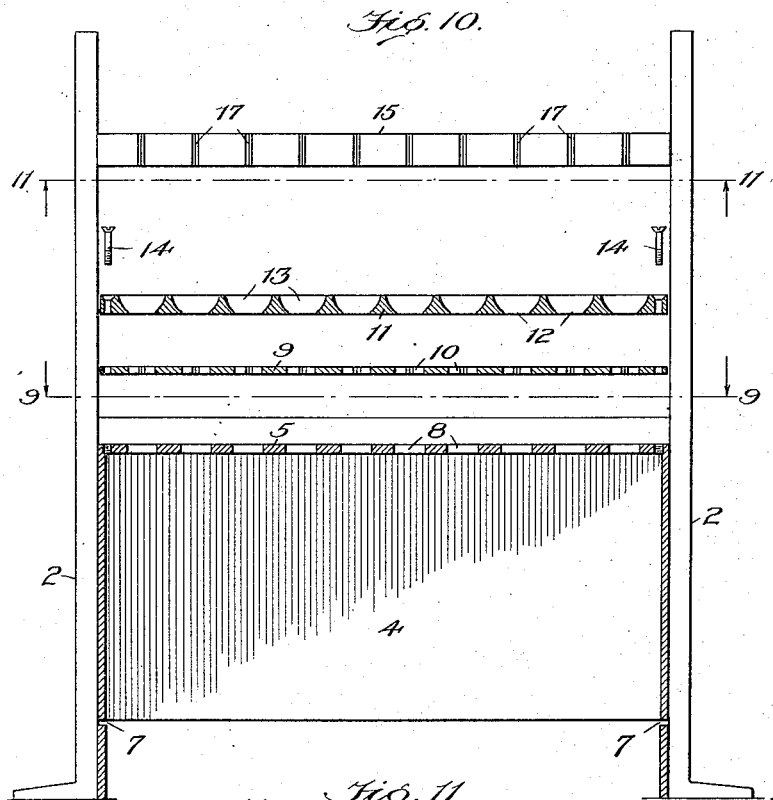
Witness
Edwin L. Bradford
Inventor
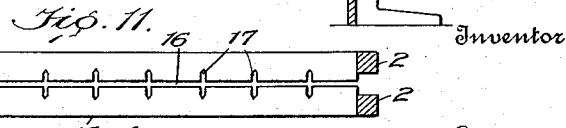
Chas. H. Marshall,
Wm. E. Dyre, Attorney C. H. MARSHALL.
CHERRY PITTING MACHINE.
APPLICATION FILED OCT. 13, 1915.
1,167,005.
Patented Jan. 4, 1916.
5 SHEETS—SHEET 5.
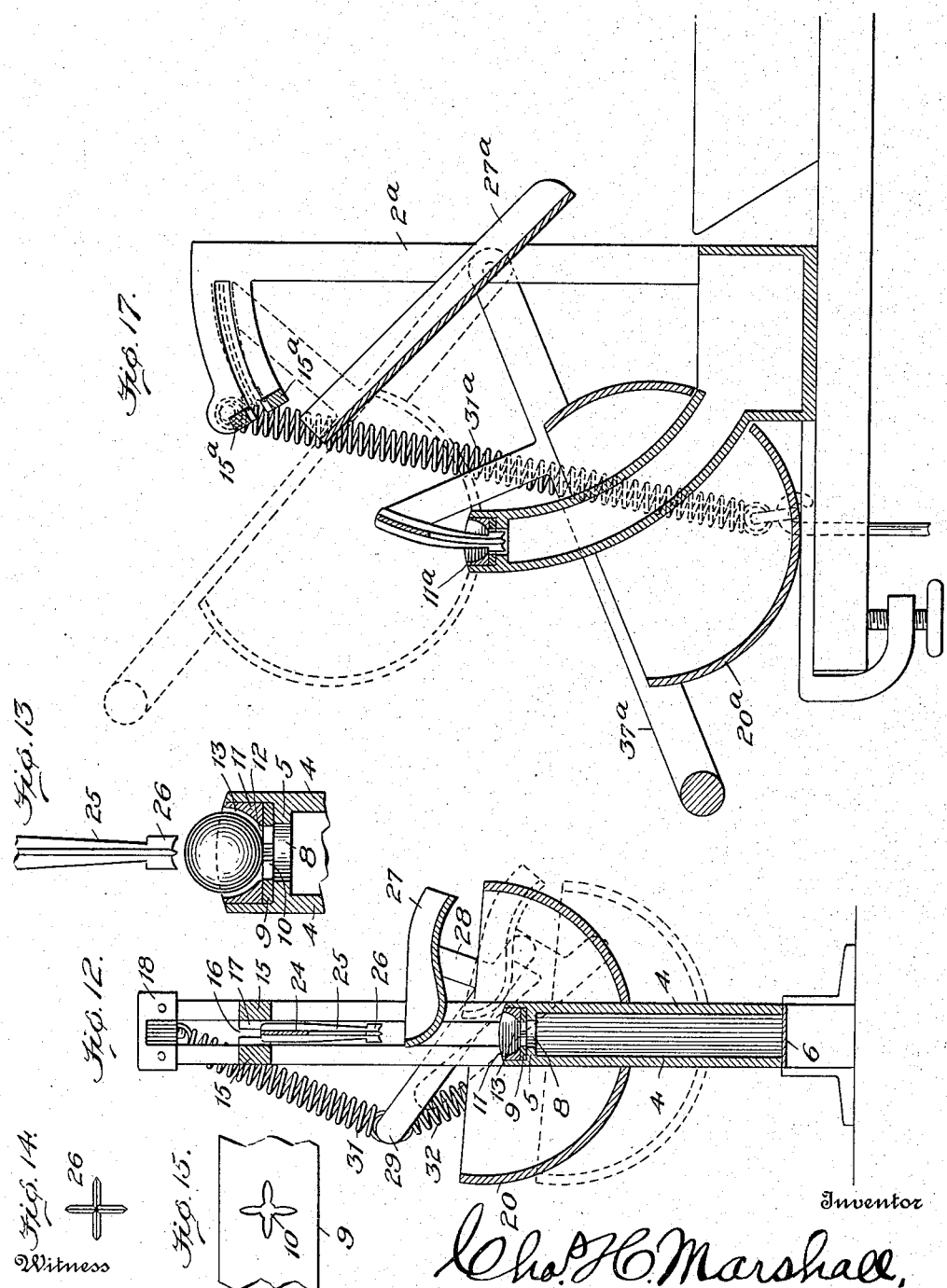

UNITED STATES PATENT OFFICE.

CHARLES H. MARSHALL, OF OMAHA, NEBRASKA.

CHERRY-PITTING MACHINE.

1,167,005. Specification of Letters Patent. Patented Jan. 4, 1916.

Application filed October 13, 1915. Serial No. 55,638.

*To all whom it may concern:*

Be it known that I, CHARLES H. MARSHALL, a citizen of the United States, residing at Omaha, in the county of Douglas and State of Nebraska, have invented certain new and useful Improvements in Cherry-Pitting Machines; and I do hereby declare the following to be a full, clear, and exact description of the invention, such as will enable others skilled in the art to which it appertains to make and use the same.

My invention relates to fruit pitters, vegetable corers, and analogous devices, but has reference more particularly to novel and improved means for pitting or removing the seeds from cherries.

It therefore has for an object the production of a machine, of the class described, which is at once of simple and economical construction, easily manipulated, and of great efficiency in the performance of its intended functions.

A further object is the production of a novel machine of the class described, which is designed, arranged and adapted to neatly and effectually remove the pits or seeds from cherries, without undue mutilation of the fruit, and without an appreciable loss of the juices, a machine capable of operating upon a multiplicity of cherries at one and the same time, and capable of being actuated either manually or mechanically.

With the foregoing and other objects in view the present invention further consists in combining a suitable reciprocating supply hopper, with a relatively fixed punching block configured by individual cherry receiving depressions or cups in its upper surface, so arranged that when the said hopper and block are in one position a supply of cherries will automatically roll from the hopper onto the said block, and when these parts are moved to another position the surplusage of cherries will roll from said block back into said hopper, leaving a single cherry in each of the said cup-like depressions, so positioned that its pit or seed may readily be driven through a central orifice by a plunger.

The present invention further consists in providing a hollow support for the said punching block which support also constitutes a receptacle for the cherry pits, and in providing means for removing pits from the said hollow receptacle.

The present invention further consists: In providing a novel and effective combination of plunger bar and pitting plungers, so arranged that the said bar and plungers may freely pass between suitable stripping plates designed and positioned to effectually strip the pitted cherries from their respective plungers as they ascend after each pitting operation. In providing a vertically and horizontally movable tray, or bearer, for the pitted cherries, in combination with means to automatically present same beneath the pitted fruit immediately before the aforesaid stripping operation, in order that the fruit may be caught as it falls from the several plungers, convey it transversely across the supply hopper, and finally discharge it into a suitable receptacle at one side of the machine. In a novel combination of the main hopper and pitting plungers, whereby as the said hopper descends to a position where the surplus cherries roll from the punching block, the pitting plungers simultaneously descend to eject all pits from the cherries remaining upon said block; and whereby as the said hopper ascends for the purpose of again supplying unpitted cherries to the punching block, those last pitted and impaled upon their respective plungers are carried upward into engagement with the superposed stripping plates. In a novel and efficient means, including a floating spring-actuated lever, for imparting to the pitted cherry tray or bearer a combined vertical, horizontal, and dumping or discharging movement.

With the foregoing and other objects and advantages in view the invention will be hereinafter particularly described and finally set forth by the appended claims.

In the accompanying drawings which form part of the present application for Letters Patent and whereon corresponding numerals refer to like parts in the several views, Figure 1 is a perspective view of one embodiment of the invention showing all movable parts in their elevated or uppermost positions, and showing in addition to operating handles attached to the machine hopper, a treadle as an alternative means of reciprocating said hopper and depending parts vertically. Fig. 2 is a side elevation of the invention, broken away at one end for the purpose of disclosing two of a series of pitting plungers, an underlying tray or bearer for pitted cherries, a punching block comprising cup-like depressions, a perforated flexible abutment, and finally a combined hollow punching block support and pit receptacle. Fig. 3 is a horizontal sectional view of the invention taken on line 3—3 of Fig. 2, and broken away at one end showing the punching block in plan. Fig. 4 is an end view with all movable parts elevated as in Fig. 1. Fig. 5 is a transverse vertical section taken on the line 5—5, Fig. 2, showing parts in their uppermost positions. Fig. 6 is a view similar to Fig. 5 and taken on the same line of Fig. 2, but showing all movable parts in their lowermost positions. Figs. 7 and 8 are top plan views respectively, of a cupped and perforated punching block, and a perforated underlying resilient abutment. Fig. 9 is a horizontal section taken on the line 9—9 of Fig. 10. Fig. 10 is a longitudinal central section through the frame of the machine, with the elements shown by Figs. 7, 8 and 9 separated. Fig. 11 is a horizontal section on the line 11—11 of Fig. 10, showing the stripper plates, through which the pitting plungers operate, in inverted plan. Fig. 12 is a transverse vertical section through the machine similar to Figs. 5 and 6, but with all movable parts in an intermediate position. Fig. 13 is an enlarged fragmentary view in transverse section of the punching block elements, and in side elevation, a cherry in position to be operated upon, also a fragment of one pitting plunger above. Fig. 14 is an end view of one cruciform pitting plunger still further enlarged to bring out its peculiar cutting edges. Fig. 15 is a fragmentary plan view of the perforated resilient abutment or intermediate element of the punching block structure showing + form of perforations therein. Fig. 16 is a fragmentary interior perspective view showing one end of the machine hopper, a superposed transverse plunger bar and plunger, and one of two uprights for rigidly connecting said hopper and bar at its ends, and Fig. 17 is a vertical central section of one modified form of the invention clamped in operative position upon an ordinary table top, and arranged to be operated either by hand or by foot power.

Reference being had to the drawings and numerals thereon, 1 indicates an ordinary table, to the top of which is screwed, clamped or otherwise secured an upright supporting frame preferably of cast metal and of unitary construction, comprising oppositely disposed ends 2, 2, grooved or channeled vertically and centrally throughout their entire lengths as at 3, sides 4, 4 connecting the edges of said end members 2, 2, to form a rectangular box-like pit receiver, a perforated top 5 for said receiver, and a removable sheet metal bottom 6 adapted to slide horizontally in grooves 7, 7 which latter are best shown by Fig. 10.

The perforations 8 in the top 5 of said pit receiver, as best shown by Fig. 9 of the drawings, are of circular form and of a diameter sufficient to permit passage of a large size cherry pit, while directly upon the surface of this top 5 and extending from end 2 to end 2 of the structure is positioned a removable abutment 9 of resilient material such as rubber or leather, provided with perforations 10 in register with those aforesaid, but of substantially cruciform shape and also of a size to permit passage of cherry pits. Immediately above the said resilient abutment 9 is another removable element extending from end to end of the structure, consisting of a punching block 11 slightly rounded or crowned upon its upper surface as shown by Figs. 5 and 6 and provided throughout its entire length with perforations 12 corresponding in size and position with the underlying perforations 8 aforesaid, each of said perforations 12 diverging upwardly to form cup-like cherry receiving depressions 13 as clearly shown, the said punching block 11 and resilient abutment 9, when assembled for use, being secured by screws 14, 14, or similar means, to top 5 of the hollow pit receiver aforesaid. At a point above the said punching block 11, but below their extreme upper ends, the upstanding frame sides 2, 2, of dual formation, are again connected by oppositely disposed but corresponding stripping plates 15, 15, by preference, though not necessarily, cast integral with their respective supporting ends, but in any event spaced apart as shown at 16, Fig. 11, and provided with oppositely positioned lateral slots 17 in vertical alinement with all of the several series of perforations aforesaid for purposes which will later appear. The uppermost portions of these upstanding frame ends 2, 2, each of dual form, are not connected by an intervening web of metal above the punching block 11 as they are below it, but from this point rise independently thus continuing the intermediate channel 3 in each, which channels above said block 11 are closed only at their extreme upper ends, and there by suitable caps 18 riveted or otherwise secured in place and provided each with an outwardly projecting eye 19.

Mounted to reciprocate vertically in the oppositely disposed channels 3, 3 of the frame ends 2, 2 is a substantially semi-cylindrical main hopper or cherry receptacle 20, having a longitudinal slot 21 in its bottom extending from end to end, of a width to just clear the sides 4, 4 of the pit receiver, and having a rectangular offset 22 at both ends to slidably surround and embrace the respective end members 2. This hopper member 20 is also equipped with standards 23 rising vertically from its center at each end and midway of its particular offset 22, the same standards being preferably cast integral with the hopper and also integral with a longitudinal plunger bar 24 connecting them above. Depending from the said bar 24 is a series of properly spaced pitting plungers 25 of substantially cruciform sectional area throughout, each having an enlarged head 26 of corresponding shape, with sharpened lower or advance edges, these plungers being arranged and positioned in exact vertical alinement with the aforesaid perforations of the punching block 11 and correlative perforations.

Interposed between the fixed stripper-plates 15, and the relatively movable hopper 20, is an offbearing tray 27 for cherries which have been pitted, this tray being so mounted as to partake of a combined vertical and horizontal motion, and to receive pitted cherries as stripped from their respective pitting plungers, to convey them to one side, and finally to deliver them over the side of hopper 20 into a suitable receptacle, not shown. This operation is entirely automatic and is accomplished by the following means, namely: The offbearing tray 27, as best shown by Figs. 1, 2, 3, and 4, is securely affixed to bent lateral arms 28, 28, formed upon oppositely arranged floating levers 29, 29, pivotally mounted as at 30 upon extreme opposite ends of the vertically movable hopper 20. Thus it will be observed that said tray 27 being pivotally connected to the hopper 20 will of necessity partake of a vertical movement with it either upwardly or downwardly, but in addition this tray 27 must be caused to move laterally or transversely across the hopper 20, to its receiving and discharging positions respectively, as it ascends and descends. This lateral movement of the offbearing tray 27 is accomplished by agency of retractile springs 31 and 32 arranged in upper and lower pairs at opposite ends of the structure, the said upper set 31 being secured to the aforesaid projecting eyes 19 as fixed points of support, and the lower set 32 being similarly secured to lugs 33 projecting from opposite ends of the hopper 20, and the opposite ends of all springs 31 and 32 being pivotally secured to a wrist pin 34 at the outer end of each floating lever 29, as best shown by Figs. 1, 2 and 4.

Cast integral with, or otherwise affixed to both ends of the semicylindrical hopper element 20 are operating handles 35, preferably of spade handle type, by means of which all reciprocating parts of the structure may be conveniently forced downward against the resistance of retractile springs 31 and 32; and as an additional operating means there are provided side links 36, as shown by Fig. 1, which are hooked into and depend from lugs 33 at bottom of hopper 20, and are equipped with a connecting treadle 37 below for foot operation when desired.

This being a description of my invention in one form of construction, its operation may be briefly set forth as follows: Presuming that all movable parts are in their neutral or uppermost positions as shown by Figs. 1, 4 and 5 of the drawings in particular, and that a supply of stemmed but unpitted cherries has been introduced into hopper 20, at the extreme bottom of which, and within slot 20, is the punching block 11, force now applied in a downward direction either by means of handles 35 or foot treadle 37, causes hopper 20 and correlative parts to descend. As the result, a series of cherries are caught in the cup-like cherry-receiving depressions 13 of punching block 11, a single cherry in each of said depressions, immediately in line with its particular descending superposed pitting plunger 25, all surplusage of cherries in the meantime rolling freely from the rounded upper surface of said punching block 11, into both sides of the descending hopper. During this initial operation it will be noted that the retractile springs 31 and 32 are being placed under tension, and moreover that the inner end of levers 29 which are pivotally connected to the hopper 20 descend with said hopper at the same rate of speed, but that the opposite or outer ends of these same levers, by reason of their yielding connection with said springs, descend at a lesser rate of speed. As a consequence there is imparted to the offbearing tray 27, in addition to its downward movement, a rotary motion upon pivots 30 as a center, causing said tray to travel laterally out of the path of the descending pitting plungers 25. Continuing downward, as indicated by Figs. 12 and 6, the plungers 25 upon engaging their respective cherries, force the pits thereof directly through the fruit, and also through the perforated punching bar 11 and underlying perforations hereinbefore described, into the box-like hollow pit-receiver beneath, the body of the fruit or cherry in the meantime being impaled upon its particular pitting plunger without undue mutilation or an appreciable loss of juice. This operation having been almost instantly performed upon a full line of cherries, and the downward pressure having been removed or relaxed, springs 31 and 32, in contracting, immediately reverse the aforesaid operation, the impaled cherries being neatly stripped from their respective pitting plungers as the latter ascend through the stripping plates 15, immediately after tray 27 has been automatically returned to the position indicated by Fig. 5. Deposited thus into the offbearing tray 27 the pitted cherries are then delivered over the side of hopper 20, as indicated by Fig. 6, into a suitable receptacle (not shown) during the next pitting or punching operation, and so the process may be indefinitely continued, the cherry pits being occasionally removed from between sides 4, 4 of the pit receiver by withdrawal of the bottom slide 6 from its supporting grooves 7, 7, in the self-evident manner.

Fig. 17 shows one modified construction of the present invention wherein a suitable pit receiver is clamped to an ordinary table top, and is provided with an arcuate forwardly extending hollow projection throughout the length of the machine, said projection being equipped at its uppe redge with a cupped and perforated punching block 11ª, as shown, and with an uprising standard 2ª having a forward arcuate extension concentrically arranged with relation to the hollow projection aforesaid, and equipped with stripping plates 15ª, 15ª. Upon the standard 2ª at the center of said arcuate members is pivotally mounted an operating bale 37ª affixed to and moving with which is a semi-cylindrical hopper 20ª slotted to pass freely over the said punching block, and provided with a tension spring 31ª interposed between same and a fixed point of support for the purpose of returning all movable parts to normal position after each punching operation. While between the said punching block and stripping plates is an angularly arranged off-bearing tray or chute 27ª secured to the upright frame member 2ª for receiving the pitted cherries after they have been stripped from the punching plungers, and delivering them from the machine into a suitable receptacle.

This being a description of my invention in its best forms of construction at present known to me, it should be understood that I do not restrict myself to the details shown and set forth, since these may be variously modified by the skilled mechanic without departing from the scope of the appended claims or the spirit of this invention.

What I therefore claim and desire to secure by Letters Patent is:

1. A cherry pitting machine comprising in combination a perforated punching block having an inclined surface between its perforations, a series of reciprocating pitting plungers adapted to enter said perforations, and means for actuating said plungers in both directions.

2. A cherry pitting machine comprising in combination a perforated punching block having a convex surface between its perforations, a series of reciprocating pitting plungers adapted to enter said perforations, and means for actuating said plungers in both directions.

3. A cherry pitting machine comprising in combination a perforated punching block having a convex surface between its perforations, means for automatically positioning unpitted cherries over the perforations of said punching block, a series of reciprocating pitting plungers adapted to enter said perforations, and means for actuating said plungers in both directions.

4. A cherry pitting machine comprising in combination a perforated punching block and a supply hopper reciprocally associated with relation to each other, the latter adapted to deposit unpitted cherries upon the former at the completion of each reciprocating movement, a series of pitting plungers in alinement with the perforations in said block, and means for actuating said plungers in reverse directions.

5. A cherry pitting machine comprising in combination a perforated punching block, a supply hopper reciprocally mounted with relation to said block, means for elevating the supply hopper and causing it to deposit unpitted cherries in predetermined positions upon said punching block, a series of pitting plungers in alinement with the perforations in said block, and means for actuating said plungers in reverse directions.

6. A cherry pitting machine comprising in combination an upstanding perforated punching block, a supply hopper having a continuous slot in its base adapted to reciprocate over said punching block, means for elevating the supply hopper and causing it to deposit unpitted cherries in predetermined positions upon the surface of said punching block, a series of pitting plungers in alinement with the perforations in said block, and means for actuating said plungers in reverse directions.

7. A cherry pitting machine comprising in combination a punching block provided with cherry receiving depressions, a supply hopper, and pit-ejecting means, said punching block and hopper being movable with relation to each other and so arranged that in one operative position the punching block is beneath the contents of the hopper and when the parts are moved to another operative position the punching block emerges from beneath the contents of the hopper with a series of cherries resting in its said receiving depressions.

8. A cherry pitting macihne comprising in combination a stationary punching block provided with cherry receiving depressions, and a movable supply hopper so arranged that in the uppermost operative position of said hopper the punching block is beneath the contents of the hopper and when moved to its lowermost position the said punching block is above the contents of the hopper with a series of cherries resting in its said receiving depressions.

9. A cherry pitting machine comprising in combination a punching block provided with cherry receiving depressions, a supply hopper, and pitting plungers adapted to pierce cherries contained in said receiving depressions for ejecting the pits and removing the pitted cherries from their receiving depressions, said punching block and hopper being movable with relation to each other and so arranged that in one operative position the punching block is beneath the contents of the hopper and when the parts are moved to another operative position the punching block emerges from beneath the contents of the hopper with a series of cherries resting in the said receiving depressions.

10. A cherry pitting machine comprising in combination a punching block provided with cherry receiving depressions, a supply hopper, pitting plungers adapted to eject the cherry pits and impale the pitted cherries upon said plungers, and means for stripping the pitted cherries from their respective plungers, said punching block and hopper being movable with relation to each other and so arranged that in one operative position the punching block is beneath the contents of the hopper and when the parts are moved to another operative position the punching block emerges from beneath the contents of the hopper with a series of cherries resting in its said receiving depressions.

11. A cherry pitting machine comprising in combination a punching block provided with cherry receiving depressions, a supply hopper, pitting plungers adapted to eject the pits and remove the pitted cherries from their receiving depressions, means for stripping the pitted cherries from their respective plungers, and means for catching and discharging the pitted cherries as stripped from said plungers, said punching block and hopper being movable with relation to each other and so arranged that in one operative position the punching block is beneath the contents of the hopper and when the parts are moved to another operative position the punching block emerges from beneath the contents of the hopper with a series of cherries resting in said receiving depressions.

12. A cherry pitting machine comprising in combination a stationary punching block provided with cherry receiving depressions, a movable supply hopper, and a series of pitting plungers movable with said hopper, said punching block and hopper being so arranged that in one operative position the punching block is beneath the contents of the hopper and when the parts are moved to another operative position the punching block emerges from beneath the contents of the hopper with a series of cherries resting in the said receiving depressions.

13. In a cherry pitting machine having stripping plates and pitting plungers relatively movable the latter being so arranged that they may pass freely between said stripping plates, a supply hopper movable with said plungers, an off-bearing tray pivotally secured to said hopper, and means for automatically moving said tray beneath said plungers as they ascend and for automatically tilting said tray upon its pivotal support to remove it from beneath said plungers as they descend.

14. In a device of the class described the combination with a perforated punching block, a series of pitting plungers adapted to coöperate with said punching block to eject pits from cherries and remove the pitted cherries from said block as the plungers ascend after the pitting operation, a supply hopper for depositing cherries upon said punching block, an offbearing tray for removing pitted cherries from the machine floating levers secured to the said tray and each pivotally connected at one end to the reciprocating supply hopper, contractile springs secured to the opposite end of each floating lever one spring being secured to a fixed point of support above and the other of said springs being secured to the said movable hopper, and means for placing said springs under tension to impart to the offbearing tray a combined vertical, lateral and dumping movement at predetermined intervals.

15. In a device of the class described the combination with a perforated fixed hollow punching block provided with cherry receiving depressions, a supply hopper arranged to reciprocate over said punching block, a series of superposed pitting plungers which are vertically movable with said hopper to eject pits from cherries contained in said depressions and to lift the pitted cherries from their respective depressions, stripping plates for removing the pitted cherries from their respective plungers, an offbearing tray, means for projecting said tray into the path of said plungers to receive pitted cherries as stripped therefrom and for moving the said tray to dumping position out of the path of said plungers as they again descend, and operating means for causing said hopper and movable parts to reciprocate in reverse directions.

In testimony whereof I affix my signature in presence of two subscribing witnesses.

CHARLES H. MARSHALL.

Witnesses:
J. E. SPELLMAN,
F. A. MASINDA.